3,351,584
N-PROPARGYL SULFAMIDES
William J. Houlihan, Mountain Lakes, N.J., assignor to Sandoz Inc., Hanover, N.J.
No Drawing. Filed July 17, 1964, Ser. No. 383,507
29 Claims. (Cl. 260—239)

ABSTRACT OF THE DISCLOSURE

The compounds are N-aralkyl-N-propargyl sulfamides, e.g., N-propargyl-N-benzylsulfamide. The compounds are useful as anti-convulsants and mild tranquilizers. Compounds having an unsubstituted amino function are prepared by reacting a suitable N-aralkyl-N-propargylamine with sulfamide. Compounds having a di-substituted amino function are prepared by reacting a suitable N,N-di-substituted-N'-aralkylsulfamide with 3-bromopropyne.

---

This is a continuation-in-part of application Ser. No. 339,354, filed on Jan. 22, 1964, now abandoned, and of Ser. No. 375,288, filed on June 15, 1964, now Patent No. 3,320,314.

The present invention is directed to three classes of N-propargyl sulfamides of the formula

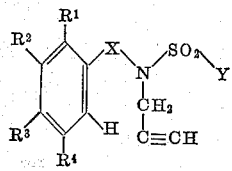

(I)

wherein:

Each of $R^1$, $R^2$, $R^3$, and $R^4$ is, independently, either a hydrogen atom, (—H); lower alkyl, e.g. methyl, ethyl, propyl, isopropyl, and butyl; lower alkoxy, e.g. methoxy, ethoxy, propoxy, isopropoxy, and butoxy; a fluorine atom (—F); or a chlorine atom (—Cl); preferably at least one of $R^1$, $R^2$, $R^3$, and $R^4$ being a chlorine atom;

Y is either hetero(mono)cyclic amino, the amino nitrogen of which is a ring nitrogen atom, e.g. aziridino, pyrrolidino, piperidino, piperazino, azetidino, N'-(lower)alkyl-N-(piperazino, such as N'-ethyl-N-piperazino, and morpholino; primary amino (—$NH_2$); or

Each of $R^5$ and $R^6$ is lower alkyl, e.g. methyl, ethyl, propyl, isopropyl, and butyl; and
X is methylene (—$CH_2$—) for one class of sulfamides; dimethylene (—$CH_2$—$CH_2$—) for the second class of sulfamides; and trimethylene (—$CH_2$—$CH_2$—$CH_2$—) for the third class of sulfamides.

The N-propargyl group is of the essence when X is methylene in providing the compounds of this invention with increased CNS (central nervous system) activity, e.g. powerful barbiturate potentiator, as compared with corresponding compounds lacking the N-propargyl group. Compounds (I) possess all of the advantageous properties and utilities of corresponding compounds lacking the propargyl group. Moreover, the N-(unsubstituted)benzyl compounds have a stimulant effect on the spinal cord.

The preparation of compounds (I) is accomplished by heating at a temperature within the range of from about 50° to about 250° C. and in a tertiary amine (a) secondary amine (II) and (b) sulfamide (III):

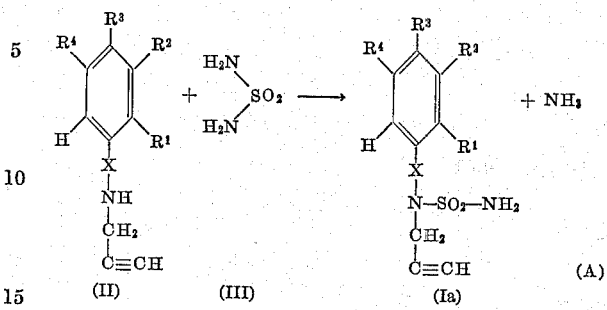

To prepare compounds (I) wherein Y is other than primary amino, i.e. Y', a sulfamide (IV), e.g. N,N-dimethyl-N'-benzylsulfamide, is treated with 3-bromopropyne (V):

For reaction (A) a temperature in excess of 50° C. is recommended, and a preferred range is from about 55° to 125° C., usually the reflux temperature of the system. Agitation may be employed during the reaction, but none is required.

The tertiary amine medium provides a solvent system in which the reaction takes place. Contemplated tertiary amines include, for example, tri(lower)alkylamines, e.g. triethylamine; (lower)alkyl pyridines, e.g. 3-ethyl pyridine; (lower)alkoxy pyridines, e.g. 2,5-dimethoxy pyridine; quinoline; (lower)alkyl quinolines, e.g. 8-ethyl quinoline; N-(lower)alkyl morpholine, e.g. N-methyl morpholine; and N,N'-di(lower)alkyl piperazine, e.g. N-methyl-N'-ethyl piperazine.

Compounds (I) are useful as anticonvulsants and mild tranquilizers which may be administered either orally or parenterally. Oral dosage forms include tablets and capsules having standard fillers and other compounding constituents. The average daily dose may vary within the range of from 50 milligrams to 300 milligrams.

Throughout the disclosure each of the variables $R^1$, $R^2$, $R^3$, $R^4$, $R^5$, $R^6$, X, Y, and Y' has its above-ascribed meaning unless otherwise indicated. Those compounds (I) wherein Y is primary amino are generally more active therapeutically than their counterparts wherein Y is Y', i.e. has another of the designated meanings for Y. Also, when one or more of $R^1$, $R^2$, $R^3$, and $R^4$ are chlorine atoms, the compounds are more active than the counterparts lacking chlorine atmos.

The processes for preparing compounds (I) are independent of the substituents on the benzene ring and of the meaning of X. Therefore, each of the examples is illustrative of all possible substitution on the benzene nucleus and for each meaning of X.

The following examples illustrate the invention, all temperatures being in degrees centigrade, the parts and percentages being by weight unless otherwise stated, and the relationship between parts by weight and parts by volume being the same as that between the kilogram and the liter.

Example 1.—N-propargyl-N-benzylsulfamide

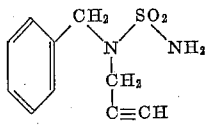

In a flask equipped with a stirrer and a condenser attached to a bubble detector dissolve 12.9 parts (0.09 mole) of N-benzylpropargylamine and 7.2 parts (0.08 mole) of sulfamide in 100 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 12 parts of N-propargyl-N-benzylsulfamide, melting point (M.P.) 116° to 118°.

In similar manner by separately replacing the N-propargyl-N-benzylamine by an equivalent amount of each of:

N-propargyl-N-(3-chloro-2-fluoro-4-isopropyl)-benzylamine,
N-propargyl-N-(4-chloro-3-fluoro-2-methoxy)-β-phenethylamine,
N-propargyl-N-(2,3-dichloro-5-isopropoxy)-γ-phenylpropylamine,
N-propargyl-N-(2-chloro-3,5-difluoro)-benzylamine,
N-propargyl-N-(2,4-dichloro-3-methoxy)-β-phenethylamine,
N-proparagyl-N-(2,5-dichloro-4-fluoro)-γ-phenylpropylamine,
N-propargyl-N-(5-butyl-3,4-dichloro)-benzylamine,
N-propargyl-N-2,3,4-trichloro-β-phenethylamine,
N-propargyl-N-2,3,5-trichloro-γ-phenylpropylamine,
N-propargyl-N-(3-methyl-2,4,5-trichloro)-benzylamine,
N-propargyl-N-3,4,5-trichloro-β-phenethylamine, and
N-propargyl-N-2,3,4,5-tetrachloro-γ-phenylpropylamine, each of the corresponding compounds (I) is obtained.

Example 2.—N-propargyl-N-3,4-dichlorobenzylsulfamide

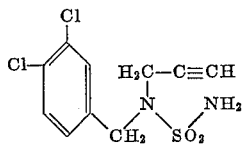

In a flask equipped with a stirrer and a condenser attached to a bubble detector dissolve 10.7 parts (0.05 mole) of N-propargyl-3,4-dichlorobenzylamine and 4.8 parts (0.05 mole) of sulfamide in 75 parts by volume of pyridine. Stir and reflux the resulting solution until gassing is no longer detected in the bubble detector. Remove the solvent (pyridine) in vacuo on a rotary evaporator. Crystallize the viscous residue from methanol-water. There are thus obtained 2.6 parts of N-propargyl-N-3,4-dichlorobenzylsulfamide, M.P. 116° to 118°.

In similar manner, by separately replacing the N-propargyl-3,4-dichlorobenzylamine by an equivalent amount of each of:

N-propargyl-N-2-chloro-β-phenethylamine,
N-propargyl-N-3-chloro-γ-phenylpropylamine,
N-propargyl-N-4-chlorobenzylamine,
N-propargyl-N-2,3-dichloro-β-phenethylamine,
N-propargyl-N-2,4-dichloro-γ-phenylpropylamine,
N-propargyl-N-2,5-dichlorobenzylamine,
N-propargyl-N-(3,4-dichloro-2-methyl)-β-phenethylamine,
N-propargyl-N-3,5-dichloro-γ-phenylpropylamine,
N-propargyl-N-2,3,4-trichlorobenzylamine,
N-propargyl-N-2,3,5-trichloro-β-phenethylamine,
N-propargyl-N-2,4,5-trichloro-γ-phenylpropylamine,
N-propargyl-N-3,4,5-trichlorobenzylamine, and
N-propargyl-N-2,3,4,5-tetrachloro-β-phenethylamine, each of the corresponding compounds (I) is obtained.

Example 3A.—N-propargyl-2,4-dichloro-β-phenethylamine

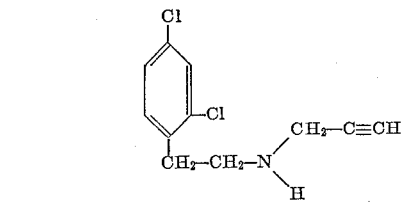

Place in a flask equipped with a stirrer, thermometer, condenser and dropping funnel, 50.0 parts (0.26 mole) of 2,4-dichloro-β-phenethylamine and 250 ml. absolute toluene. Stir and add dropwise at room temperature 15.7 parts (10.3 parts by volume; 0.13 mole) of 3-bromopropyne. Continue stirring for about 15 hours. Filter off the resultant amine salts (27.7 parts), and concentrate the filtrate on a rotary evaporator. Distill the residue through a Claisen head. There are thus obtained 13.2 parts of the desired product, boiling point (B.P.) 120° to 128°, 0.25 millimeter, $n_D^{20}$ 1.5580.

Example 3B.—N-propargyl-N-2,4-dichloro-β-phenethylsulfamide

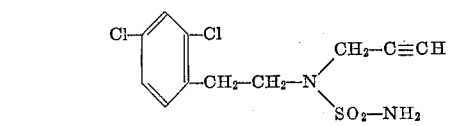

In a flask equipped with a stirrer and a condenser attached to a bubble detector dissolve 13.2 parts (0.057 mole) of N-propargyl-2,4-dichloro-β-phenethylamine and 5.0 parts (0.052 mole) of sulfamide in 100 parts by volume of absolute pyridine. Stir and reflux the resulting solution until gassing is no longer detected in the bubble detector. Remove the solvent (pyridine) in vacuo on a rotary evaporator. Crystallize the viscous residue from diethyl ether-pentane. There are thus obtained 7.7 parts of N-propargyl N - 2,4 - dichloro-β-phenethylsulfamide, M.P. 88° to 90°.

Example 4.—N,N-dimethyl-N'-propargyl-N'-benzylsulfamide

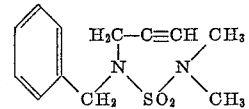

To a solution of 3.0 parts (0.055 mole) of sodium methoxide in 200 parts of dry methanol add 10.7 parts (0.05 mole) of N,N-dimethyl-N'-benzyl sulfamide. Place the solution in a rotary evaporator and then remove the solvent in vacuo until dryness. The crude sodium salt is then suspended in 150 parts of dry toluene and 15 parts of dry dimethyl formamide. Stir the obtained slurry, and add dropwise thereto a solution of 7.2 parts (4.75 parts by volume, 0.06 mole) of 3-bromopropyne in 150 parts by volume of dry toluene and 15 parts by volume of dry dimethylformamide. Stir the mixture overnight (about 17 hours) at room temperature (20°). Filter off the salts and concentrate the filtrate in vacuo on a rotary evaporator. Chromatograph the viscous residue in a column containing 120 parts of alumina. Distill the chloroform eluate (4.0 parts) through a Claisen head to give 3.7 parts of N,N-dimethyl-N'-propargyl-N'-benzylsulfamide of boiling point (B.P.) 144° to 145° at 0.2 mm.

In similar manner by separately replacing the N,N-dimethyl-N'-benzylsulfamide by an equivalent amount of each of:

N-ethyl-N-butyl-N'-(2-fluoro-4-isopropyl)-β-phenethylsulfamide,

N,N-diisopropyl-N'-(3,5-dimethoxy)-γ-phenylpropyl-
sulfamide,
N-methyl-N-isopropyl-N'-(3-methyl-5-ethyl)-benzyl-
sulfamide,
N-pentamethylene-N'-(4-chloro-3-fluoro-2-methoxy)-β-
phenethylsulfamide,
N-dimethylene-N'-γ-phenylpropylsulfamide,
N-tetramethylene-N'-(3-chloro-2-fluoro-4-isopropyl)-
benzylsulfamide,
N-hexamethylene-N'-(2,3-dichloro-5-isopropoxy)-β-
phenethylsulfamide,
N-(3'-aza)-tetramethylene-N'-(2-chloro-3,5-difluoro)-
γ-phenylpropyl-sulfamide,
N-(3'-methylaza)-tetramethylene-N'-(2,4-dichloro-3-
methoxy)-benzylsulfamide,
N-(3'-oxa)-tetramethylene-N'-(2,5-dichloro-4-fluoro)-β-
phenethylsulfamide,
N-pentamethylene-N'-(5-butyl-3,4-dichloro)-γ-
phenylpropylsulfamide,
N-dimethylene-N'-2,3,4-trichlorobenzylsulfamide,
N-tetramethylene-N'-2,3,5-trichloro-β-phenethyl-
sulfamide,
N-hexamethylene-N'-(3-methyl-2,4,5-trichloro)-γ-
phenylpropylsulfamide,
N-(3'-aza)-tetramethylene-N'-3,4,5-trichlorobenzyl-
sulfamide, and
N-(3'-ethylaza)-tetramethylene-N'-2,3,4,5-tetrachloro-
β-phenethylsulfamide, each of the corresponding compounds (I) is obtained.

It is thought that the invention and its advantages will be understood from the foregoing description. It is apparent that various changes may be made in the structures of compounds (I) without departing from the spirit and scope of the invention or sacrificing its material advantages. The examples merely provided illustrative embodiments.

What is claimed is:

1. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - NH_2$$

wherein each of $R^1$, $R^2$, $R^3$, and $R^4$ is, independently, a member selected from the group consisting of a hydrogen atom, lower alkyl, lower alkoxy, a fluorine atom and a chlorine atom.

2. N-propargyl-N-3,4-dichlorobenzylsulfamide.
3. N-propargyl-N-benzylsulfamide.
4. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - N \overset{\text{(lower alkyl)}}{\underset{\text{(lower alkyl)}}{}}$$

wherein each of $R^1$, $R^2$, $R^3$, and $R^4$ is, independently, a member selected from the group consisting of a hydrogen atom, lower alkyl, lower alkoxy, a fluorine atom and a chlorine atom.

5. N,N-dimethyl-N'-propargyl-N'-benzylsulfamide.
6. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - N \overset{CH_2 - CH_2}{\underset{CH_2 - CH_2}{}}$$

wherein each of $R^1$, $R^2$, $R^3$, and $R^4$ is, independently, a member selected from the group consisting of a hydrogen atom, lower alkyl, lower alkoxy, a fluorine atom, and a chlorine atom.

7. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - N \overset{CH_2 - CH_2}{\underset{CH_2 - CH_2}{\diagdown CH_2}}$$

wherein each of $R^1$, $R^2$, $R^3$, and $R^4$ is, independently, a member selected from the group consisting of a hydrogen atom, lower alkyl, lower alkoxy, a fluorine atom, and a chlorine atom.

8. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - N \overset{CH_2 - CH_2 - C - H_2}{\underset{CH_2 - CH_2 - C - H_2}{}}$$

wherein each of $R^1$, $R^2$, $R^3$, and $R^4$ is, independently, a member selected from the group consisting of a hydrogen atom, lower alkyl, lower alkoxy, a fluorine atom, and a chlorine atom.

9. A compound of the formula $$\underset{R^4}{\underset{R^3}{\underset{R^2}{\overset{R^1}{\text{benzene ring}}}}} - CH_2 - \underset{\underset{C \equiv CO}{\overset{CH_2}{|}}}{N} - SO_2 - N \overset{CH_2 - CH_2}{\underset{CH_2 - CH_2}{\diagdown O}}$$

wherein each of $R^1$, $R^2$, $R^3$, and $R^4$ is, independently, a member selected from the group consisting of a hydrogen atom, lower alkyl, lower alkoxy, a fluorine atom, and a chlorine atom.

10. A compound of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - N \overset{CH_2 - CH_2}{\underset{CH_2 - CH_2}{\diagdown N-R}}$$

wherein:
R is a member selected from the group consisting of a hydrogen atom and lower alkyl, and
each of $R^1$, $R^2$, $R^3$, and $R^4$ is, independently, a member selected from the group consisting of a hydrogen atom, lower alkyl, lower alkoxy, a fluorine atom, and a chlorine atom.

11. A sulfamide of the formula $$\underset{R^4}{\underset{R^3}{\underset{R^2}{\overset{R^1}{\text{benzene ring}}}}} - CH_2 - \underset{\underset{C \equiv CH}{\overset{CH_2}{|}}}{N} - SO_2 - Y$$

wherein:
each of $R^1$, $R^2$, $R^3$, and $R^4$ is, independently, a member selected from the group consisting of a hydrogen atom, lower alkyl, lower alkoxy, a fluorine atom and a chlorine atom, and
Y is a member selected from the group consisting of aziridino, pyrrolidino, piperidino, piperazino, azetidino, N'-(lower) alkyl-N-piperazino and morpholino.

12. A compound of the formula $$R^2\text{-}\underset{R^3}{\underset{|}{\overset{R^1}{\underset{|}{C_6H_2}}}}\text{-}CH_2\text{-}CH_2\text{-}\underset{\underset{C\equiv CH}{\overset{|}{CH_2}}}{N}\text{-}SO_2\text{-}NH_2$$

wherein each of $R^1$, $R^2$, $R^3$, and $R^4$ is, independently, a member selected from the group consisting of a hydrogen atom, lower alkyl, lower alkoxy, a fluorine atom, and a chlorine atom.

13. N-propargyl-N-2,4-dichloro-β-phenethylsulfamide.

14. N - propargyl - N - 2,4,6 - trichloro - β - phenethyl-sulfamide.

15. A compound of the formula

[structure with $R^1, R^2, R^3, R^4$ substituted phenyl-$CH_2$-$CH_2$-N($CH_2$-C≡CH)-$SO_2$-N(lower alkyl)(lower alkyl)]

wherein each of $R^1$, $R^2$, $R^3$, and $R^4$ is, independently, a member selected from the group consisting of a hydrogen atom, lower alkyl, lower alkoxy, a fluorine atom and a chlorine atom.

16. A compound of the formula

[structure with aziridine ring on sulfonamide N]

wherein each of $R^1$, $R^2$, $R^3$, and $R^4$ is, independently, a member selected from the group consisting of a hydrogen atom, lower alkyl, lower alkoxy, a fluorine atom and a chlorine atom.

17. A compound of the formula

[structure with pyrrolidino group]

wherein each of $R^1$, $R^2$, $R^3$, and $R^4$ is, independently a member selected from the group consisting of a hydrogen atom, lower alkyl, lower alkoxy, a fluorine atom and a chlorine atom.

18. A compound of the formula

[structure with piperidino group]

wherein each of $R^1$, $R^2$, $R^3$, and $R^4$ is, independently, a member selected from the group consisting of a hydrogen atom, lower alkyl, lower alkoxy, a fluorine atom and a chlorine atom.

19. A compound of the formula

[structure with morpholino group]

wherein each of $R^1$, $R^2$, $R^3$, and $R^4$ is, independently, a member selected from the group consisting of a hydrogen atom, lower alkyl, lower alkoxy, a fluorine atom and a chlorine atom.

20. A compound of the formula

[structure with piperazino group bearing N-R]

wherein:
R is a member selected from the group consisting of a hydrogen atom and lower alkyl, and
each of $R^1$, $R^2$, $R^3$, and $R^4$ is, independently, a member selected from the group consisting of a hydrogen atom, lower alkyl, lower alkoxy, a fluorine atom and a chlorine atom.

21. A sulfamide of the formula $$R^2\text{-}\underset{R^3}{\underset{|}{\overset{R^1}{\underset{|}{C_6H_2}}}}\text{-}CH_2\text{-}CH_2\text{-}\underset{\underset{C\equiv CH}{\overset{|}{CH_2}}}{N}\text{-}SO_2\text{-}Y$$

wherein:
each of $R^1$, $R^2$, $R^3$, and $R^4$ is, independently, a member selected from the group consisting of a hydrogen atom, lower alkyl, lower alkoxy, a fluorine atom and a chlorine atom, and
Y is a member selected from the group consisting of aziridino, pyrrolidino, piperidino, piperazino, azetidino, N'-(lower) alkyl-N-piperazino and morpholino.

22. A compound of the formula $$R^2\text{-}\underset{R^3}{\underset{|}{\overset{R^1}{\underset{|}{C_6H_2}}}}\text{-}CH_2\text{-}CH_2\text{-}CH_2\text{-}\underset{\underset{C\equiv CH}{\overset{|}{CH_2}}}{N}\text{-}SO_2\text{-}NH_2$$

wherein each of $R^1$, $R^2$, $R^3$, and $R^4$ is, independently, a member selected from the group consisting of a hydrogen atom, lower alkyl, lower alkoxy, a fluorine atom and a chlorine atom.

23. A compound of the formula

[structure with -CH2-CH2-CH2- linker and N(lower alkyl)(lower alkyl)]

wherein each of $R^1$, $R^2$, $R^3$, and $R^4$ is, independently, a member selected from the group consisting of a hydrogen atom, lower alkyl, lower alkoxy, a fluorine atom and a chlorine atom.

24. A compound of the formula

[structure with -CH2-CH2-CH2- linker and aziridino group]

wherein each of $R^1$, $R^2$, $R^3$, and $R^4$ is, independently, a member selected from the group consisting of a hydrogen atom, lower alkyl, lower alkoxy, a fluorine atom and a chlorine atom.

25. A compound of the formula

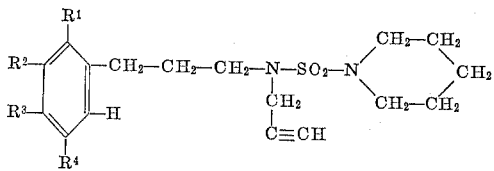

wherein each of $R^1$, $R^2$, $R^3$, and $R^4$ is, independently, a member selected from the group consisting of a hydrogen atom, lower alkyl, lower alkoxy, a fluorine atom and a chlorine atom.

26. A compound of the formula

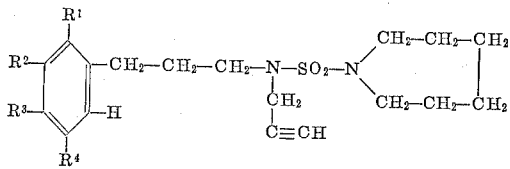

wherein each of $R^1$, $R^2$, $R^3$, and $R^4$ is, independently, a member selected from the group consisting of a hydrogen atom, lower alkyl, lower alkoxy, a fluorine atom and a chlorine atom.

27. A compound of the formula

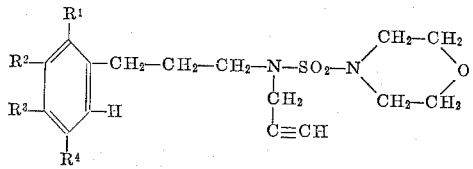

wherein each of $R^1$, $R^2$, $R^3$, and $R^4$ is, independently, a member selected from the group consisting of a hydrogen atom, lower alkyl, lower alkoxy, a fluorine atom, and a chlorine atom.

28. A compound of the formula

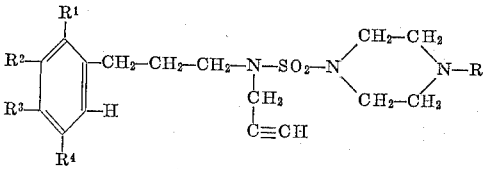

wherein:
R is a member selected from the group consisting of a hydrogen atom and lower alkyl, and
each of $R^1$, $R^2$, $R^3$, and $R^4$ is, independently, a member selected from the group consisting of a hydrogen atom, lower alkyl, lower alkoxy, a fluorine atom, and a chlorine atom.

29. A sulfamide of the formula

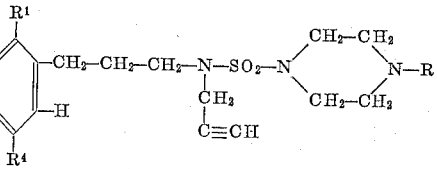

wherein:
each of $R^1$, $R^2$, $R^3$, and $R^4$ is, independently, a member selected from the group consisting of a hydrogen atom, lower alkyl, lower alkoxy, a fluorine atom, and a chlorine atom, and
Y is a member selected from the group consisting of aziridino, pyrrolidino, piperidino, piperazino, azetidino, N'-(lower) alkyl-N-piperazino and morpholino.

No references cited.

ALTON D. ROLLINS, *Primary Examiner.*